US005384709A

United States Patent [19]

Seder et al.

[11] Patent Number: 5,384,709

[45] Date of Patent: Jan. 24, 1995

[54] MINIATURE FLUORESCENT LAMP PROCESSING APPARATUS

[75] Inventors: Thomas A. Seder, Cedar Rapids; William S. Ebeltoft, Marion; W. David Meyer, Cedar Rapids, all of Iowa

[73] Assignee: Rockwell International Corporation, Seal Beach, Calif.

[21] Appl. No.: 21,425

[22] Filed: Feb. 23, 1993

[51] Int. Cl.[6] .......... G06F 15/46

[52] U.S. Cl. .......... 364/468; 364/473; 364/570; 445/73

[58] Field of Search .......... 445/26, 22, 9, 16, 17, 445/73, 70, 66; 364/473, 550, 468, 473, 570; 65/59.1, 34, 160, DIG. 13, DIG. 16

[56] References Cited

U.S. PATENT DOCUMENTS

| | | | |
|---|---|---|---|
| 3,313,610 | 4/1967 | Wilson et al. | 65/34 |
| 3,932,164 | 1/1976 | Gebhardt | 65/34 |
| 3,967,871 | 7/1976 | Kerekes | 65/34 |
| 4,481,442 | 11/1984 | Albrecht et al. | 445/26 |
| 4,768,985 | 9/1988 | Hamai | 445/73 |
| 5,108,331 | 4/1992 | Shimada et al. | 445/22 |

*Primary Examiner*—Emanuel T. Voeltz
*Assistant Examiner*—Thomas Peeso
*Attorney, Agent, or Firm*—Gregory G. Williams; M. Lee Murrah; H. Fredrick Hamann

[57] ABSTRACT

A automated miniature fluorescent lamp processing station is disclosed which is used to fabricate miniature fluorescent lamps. The system includes: flow-through gas processing to enhance buffer gas purity, monitoring of the temperature of every lamp in a batch during processing to permit accurate determination of required bus buffer gas fill pressures, real-time determination of target filled pressure at the lamp temperature processing by use of a gas law algorithm and use of microprocessor interfaced sensors and transducers to effect the high level of automation typically required to fabricate avionics grade lamps.

5 Claims, 4 Drawing Sheets

1/4

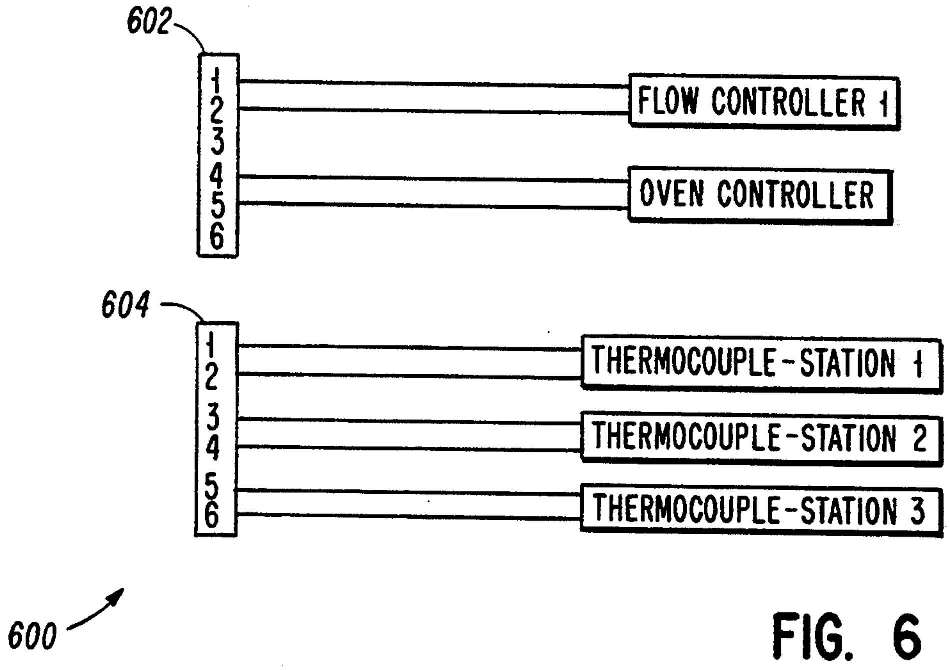
FIG. 6
FIG. 7
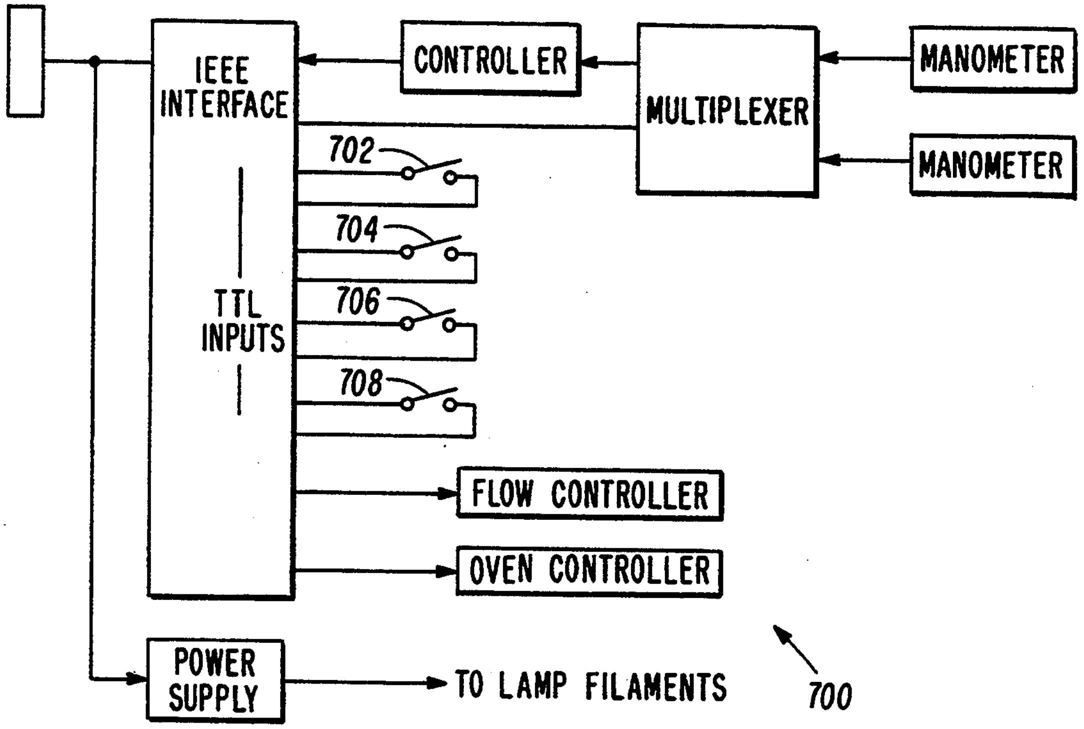

MINIATURE FLUORESCENT LAMP PROCESSING APPARATUS

FIELD OF THE INVENTION

The present invention generally relates to apparatus for manufacturing miniature fluorescent lamps, and more particularly relates to such apparatus having a flow-through gas design and even more particularly concerns a computer controlled apparatus for manufacturing miniature fluorescent lamps.

BACKGROUND OF THE INVENTION

In the past, manufacturers of miniature fluorescent lamps have relied heavily upon the personal skill and intuition of numerous skilled artisans.

For example, a miniature fluorescent lamp might be manufactured as follows:

Several glass tubes with the phosphors already deposited therein might be placed in an oven with a single temperature gauge and the temperature raised in order to affect a degassing of the coated tubes. The tubes will be sealed at one end and filled from the other with argon and then evacuated. The process is repeated several times in order to remove the contaminants, which are a by-product of the degassing process.

The artisan will manually control valves, to adjust the pressure in the lamp. While this method has been employed in the past, and has been used to make numerous miniature fluorescent lamps, it does have several serious drawbacks.

First, placing several lamps in a single oven with a single temperature gauge causes temperature uncertainty due to even heat distribution in the oven. This can result in unpredictable gas pressure in the finished fluorescent lamp.

Secondly, the repeated back-flushing approach toward removing the contaminants from the degassing process fails to effectively remove all the contaminants from the lamp.

Finally, there exists a need for improvement in the apparatus and method for manufacturing miniature fluorescent lamps to provide for greater consistency in the characteristics of the lamp.

SUMMARY OF THE INVENTION

It is an object of the present invention to provide an apparatus for manufacturing lamps having more consistent gas pressures therein.

It is a feature of the present invention to include a temperature sensor adjacent each lamp in the oven. Each temperature sensor measures the temperature at each particular lamp.

It is another feature of the present invention to include a computer controlled apparatus for controlling the valves and pressure of gas supplied to the lamps.

It is an advantage of the present invention to precisely control the pressure of the gas within the finished lamp.

It is another object of the present invention to provide a lamp with enhanced luminance.

It is a feature of the present invention to provide an apparatus for manufacturing lamps that includes a flow-through design for carrying away the contaminants caused by the degassing process.

It is an advantage of the present invention to greatly reduce the amount of contaminants remaining in the lamp and thereby increasing the luminance of the lamp.

The present invention provides an apparatus for manufacturing miniature fluorescent lamps, which is designed to satisfy the aforementioned needs, produce the earlier propounded objects, include the above described features and achieve the already articulated advantages. The invention is carried out in a "backflush-less" system in the sense that the repeated backflushes in and out a single orifice of the fluorescent lamp have been eliminated. Instead, a flow-through design is utilized where a gas is passed through both one open end of the fluorescent lamp and out the other. The invention is also carried out in a "widely variable internal gas pressure-less" fashion in the sense that the widely varying internal gas pressures associated with lamps produced without strict process controls have been reduced. Instead, the present invention includes a computer controlled manifold system that monitors the temperature around each lamp and provides for more precise regulation of the valves and, thus, the internal gas pressure of the finished lamp.

BRIEF DESCRIPTION OF THE DRAWINGS

The invention may be more fully understood by reading the following description of a preferred embodiment of the invention in conjunction with the appended drawings wherein:

FIG. 6 is a schematic diagram of the analog interface of the present invention.

FIG. 7 is a schematic electronic representation of the IEEE 488 interface of the present invention.

DETAILED DESCRIPTION

Figure 1:
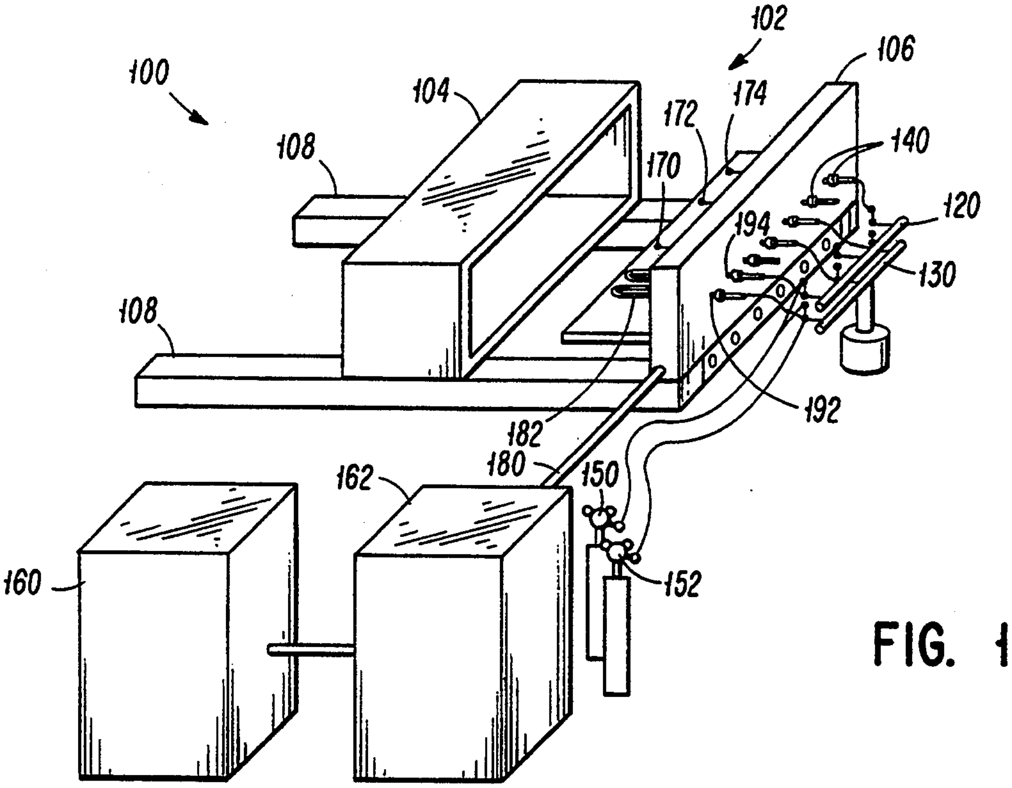
FIG. 1 is a perspective view of the apparatus of the present invention showing the oven, inlet manifold, exhaust manifold, and computer control devices.

Now referring to the figures wherein like numerals refer to like subject matter throughout. The system, as shown in FIG. 1, is generally designated 100, has an adjustable temperature oven, generally designated 102, with a translatable oven box 104 and a fixed oven endplate 106. Box 104 is shown disposed on rails 108 which are preferably V grooved for receiving the box 104. Oven 102 is shown having an inlet manifold 120, which has computer controlled valves associated therewith, an exhaust manifold 130, which has computer controlled valves associated therewith, a plurality of computer controlled tipoff ovens 140, compressed gas tanks 150 and 152, and electronics computer cabinets 160 and 162. Also shown is first temperature sensor 170, second temperature sensor 172 and third temperature sensor 174 which are coupled to electronics cabinets 160 and 162 by electronics bus 180.

In operation, the present invention is utilized to manufacture miniature fluorescent lamps by placing lamps in contact with the temperature sensors 170, 172 and 174, and translating the box 104 so that it meets firmly with endplate 106. Lamp 182 which has a first end (not shown) and second end (not shown) and is configured in an "m" shape, however, other shapes could be utilized. First end is coupled to first exhaust port 192 and second lamp end connected to first inlet manifold port 194. The computer monitors the temperature at each lamp station and monitors and controls the pressure in the manifolds so as to allow for the proper gas pressure in the lamp at its particular temperature. The computer processors in cabinets 160 and 162 are capable of monitoring the temperature at each lamp station and calculate using the ideal gas law, the desired fill pressure for that temperature which results in the proper gas pressure at the operating temperature of the lamp.

Figure 2:
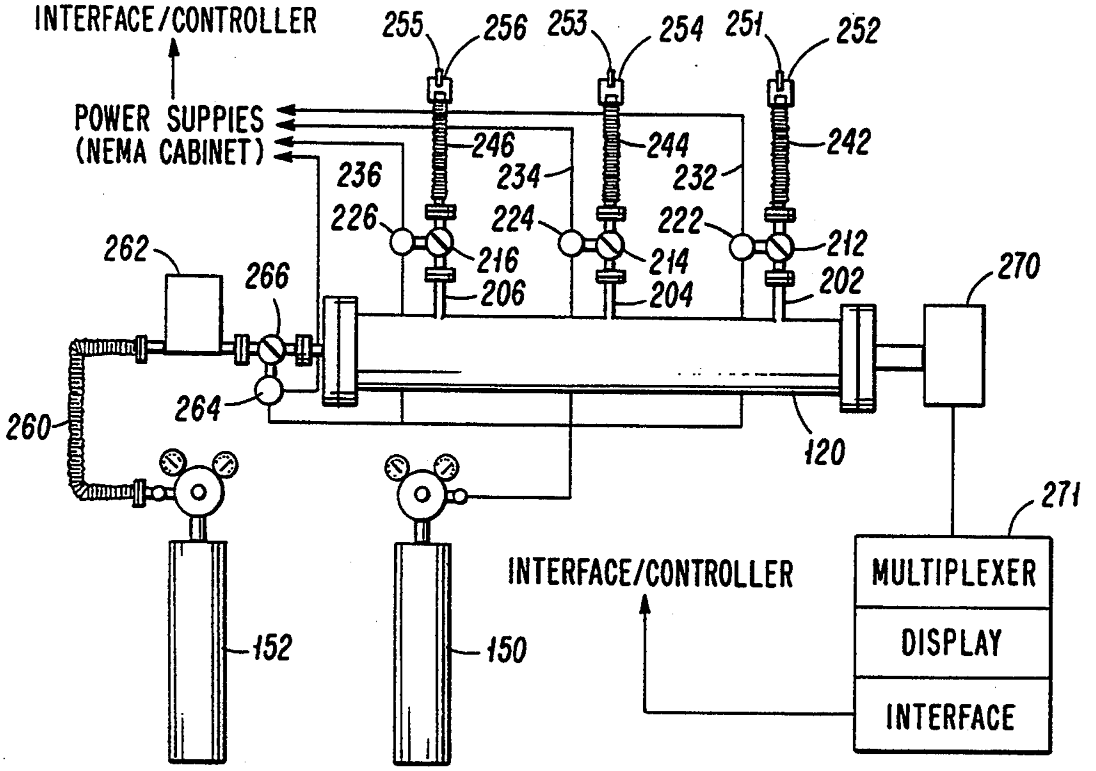
FIG. 2 is a schematic representation of the inlet manifold and related hardware.

Now referring to FIG. 2, there is shown the inlet manifold 120, of FIG. 1 and its accompanying hardware and structure. The manifold 120 allows high purity argon to be admitted to the lamp at controlled mass flow rate. Flows from the manifold 120 will be used to both purge the lamp of impurities and fill the lamp to the final desired fill pressure with accuracy and precision. Manifold 120 is shown having a first manifold port 202, a second manifold port 204, and a third manifold port 206 which are respectively coupled with first intake bellows valve 212, second intake bellows valve 214 and third intake bellows valve 216, which are respectively coupled to first valve solenoid 222, second valve solenoid 224 and third valve solenoid 226, respectively. These valves are coupled to the electronics cabinets 160 and 162 along electrical lines 232, 234 and 236. Valves 212, 214 and 216 are coupled with fittings 252, 254 and 256, respectively, by tubes 242, 244 and 246, respectively, which are coupled with inlet tubulation 251, 253 and 255, respectively. Manifold 120 is coupled at one end to UHP argon supply 152 through flex-tubing 260 and through flow controller 262. The output of the valve is controlled by an electrical signal proportional to the flow rate. The command signal input is preferably connected to one of the analog output ports on the MKS 288 IEE controller (FIG. 7).

Flow controller 262 is preferably coupled to air actuated bellows shut-off valve 266 which is coupled to solenoid valve 264.

Manifold 120 is coupled to pressure transducer 270 which is preferably a 0–100 TORR full scale (absolute pressure) capacitance manometer and preferably has an output that is proportional to manifold pressure. It is operable over the range of 15–200 degrees centigrade. Pressure transducer 270 is coupled with a power supply and readout electronics 271 which have an output to the IEE 488 interface (FIG. 7).

In operation, the inlet manifold 120 is capable of providing argon from argon tank 152 to tubulations 251, 253 and 255 on a precisely regulated basis by passing from the tank 152 through the valve 266 which is controlled by solenoid 264 into manifold 120. The pressure is monitored by pressure transducer 270 and controlled by valve 266 and allowed to pass from manifold 120 to tubulations 251, 253, 255 by valves 212, 214 and 216 which are controlled by solenoids 222, 224 and 226, respectively.

Figure 3:
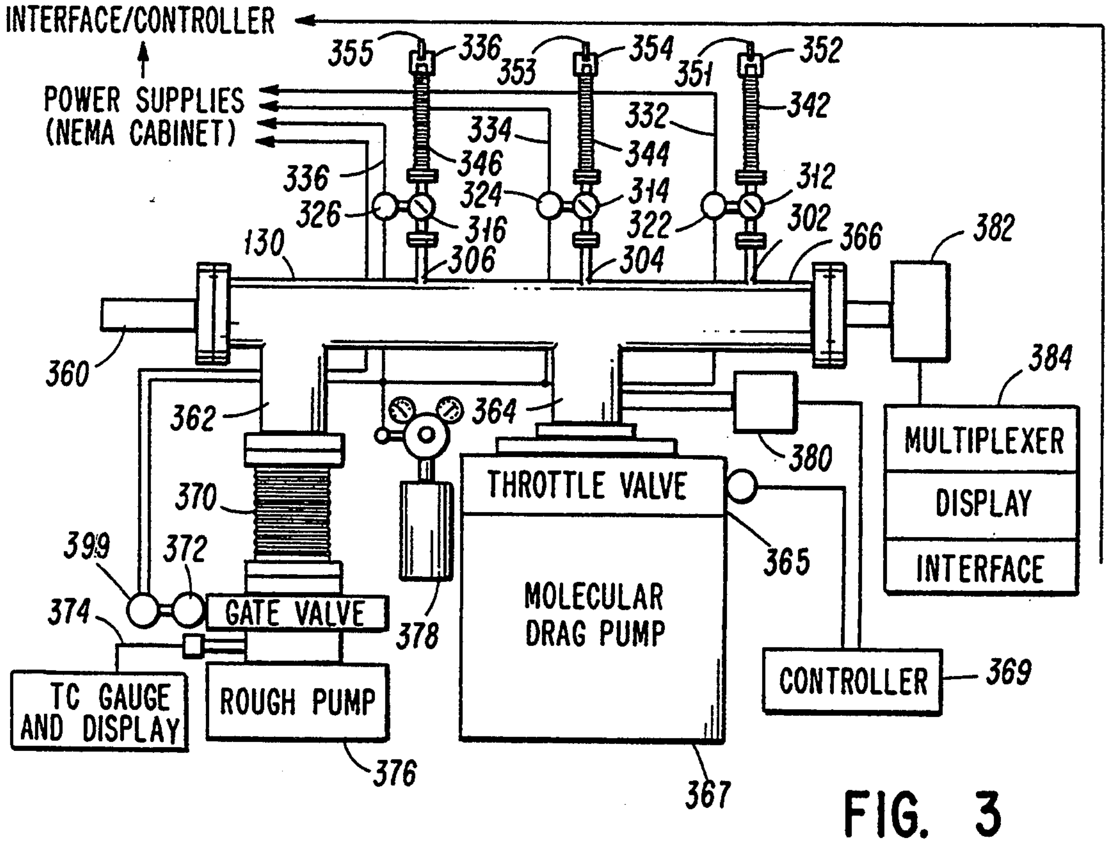
FIG. 3 is a schematic representation of the exhaust manifold and related hardware.

Now referring to FIG. 3, there is shown an exhaust manifold 130, of FIG. 1. The exhaust manifold 130 collects gases generated during lamp processing as well as the argon purge gas. Gas flow is always from the lamp to the exhaust manifold.

The manifold 130 includes a first exhaust port 302, second exhaust port 304, and a third exhaust port 306 which are coupled in a regulated fashion to three exhaust tubulations 352, 354, and 356 which would extend in to one end of three different fluorescent lamps. The valves 312, 314 and 316 are coupled to the tubulations 352, 354 and 356, respectively, by tubes 342, 344 and 346, respectively. At one end of the manifold 130 is cold cathode gauge and controller 360 which is used to measure the base pressure of the molecular drag pump 367. Also coupled to the manifold 130 is a rough pump port 362 which is coupled to the rough pump 376 by bellows 370, gate valve 372 and TC gauge and display 374. Also coupled to manifold 130 is molecular drag pump port 364, which is coupled to molecular drag pump 367 and throttle valve 365. The valve 367 is electronically coupled to controller 369. Also shown is a tank of compressed nitrogen 378 which is coupled to electropnuematic valves 312, 314, 316, and 372 through the solenoid valves 322, 324, 326 and 399. The molecular drag port 364 is coupled to pressure transducer 380 which is an absolute pressure capacitance manometer, preferably having an electrical output that is proportional to the manifold pressure and can be operated over the range of 15–200 degrees centigrade. This manometer 380 is coupled to controller 369. Also coupled to manifold 130 is pressure transducer 382, which is similar to pressure transducer 380. Pressure transducer 382 is coupled to interface and read out electronics 271.

Figure 4:
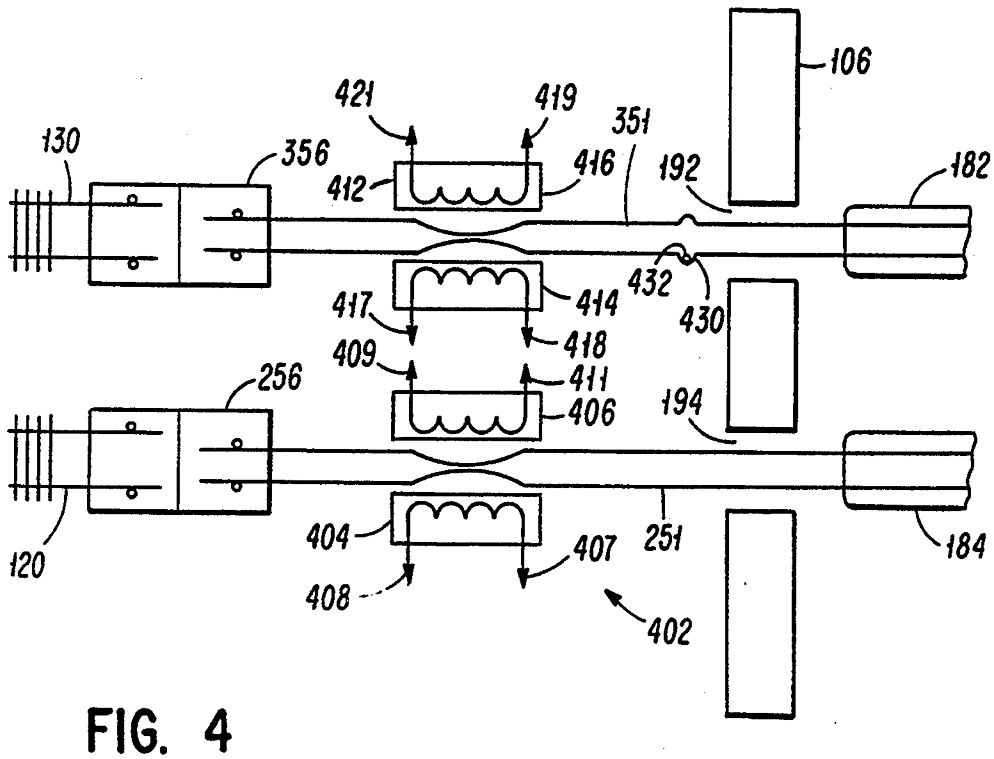
FIG. 4 is a cross-sectional top view of the tipoff ovens and coils and associated hardware.

Now referring to FIG. 4, there is shown a schematic representation of the interconnections between lamp ends 182 and 184 and exhaust manifold 130 and inlet manifold 120. Exhaust tubulation 351 extends through the end plate wall 106 and into the lamp legs 182, which are disposed on the oven box 104 side of the end wall 106. The exhaust tubulation 351 is shown having a mercury trough 430 with a drop 432 of mercury disposed therein. The exhaust tubulation extends to coupler 356, which couples the tubulation into exhaust manifold 130. The exhaust tubulation extends through the tip off oven 412, which consists of a first tip off coil 414 and a second tip off coil 416 which have electrical connections 417, 418 and 419, 421 coupled thereto, respectively. These connections 417, 418, 419, and 421 are coupled to the electronics cabinet 160. Currents are caused to flow through coils 416 and 414 thereby creating a high temperature area therebetween and causing the tubulation 351 to seal or "tip off". This is accomplished in a regulated and precise manner by the computer processor in cabinet 160.

Similarly, the inlet tubulation 251 is coupled from the inlet manifold 120 through the connector 256 to lamp leg 184. Tubulation 251 is disposed between tip off oven 402 which comprises a first tip off coil 404 and a second tip off coil 406, which are coupled to electronics cabinet 160 (not shown) by leads 407, 408 and 409, 411, respectively. Both tubulation 351 and 251 are shown in the process of being tipped off where the tubulation is still capable of permitting flow therethrough, however, is almost tipped off.

Figure 5:
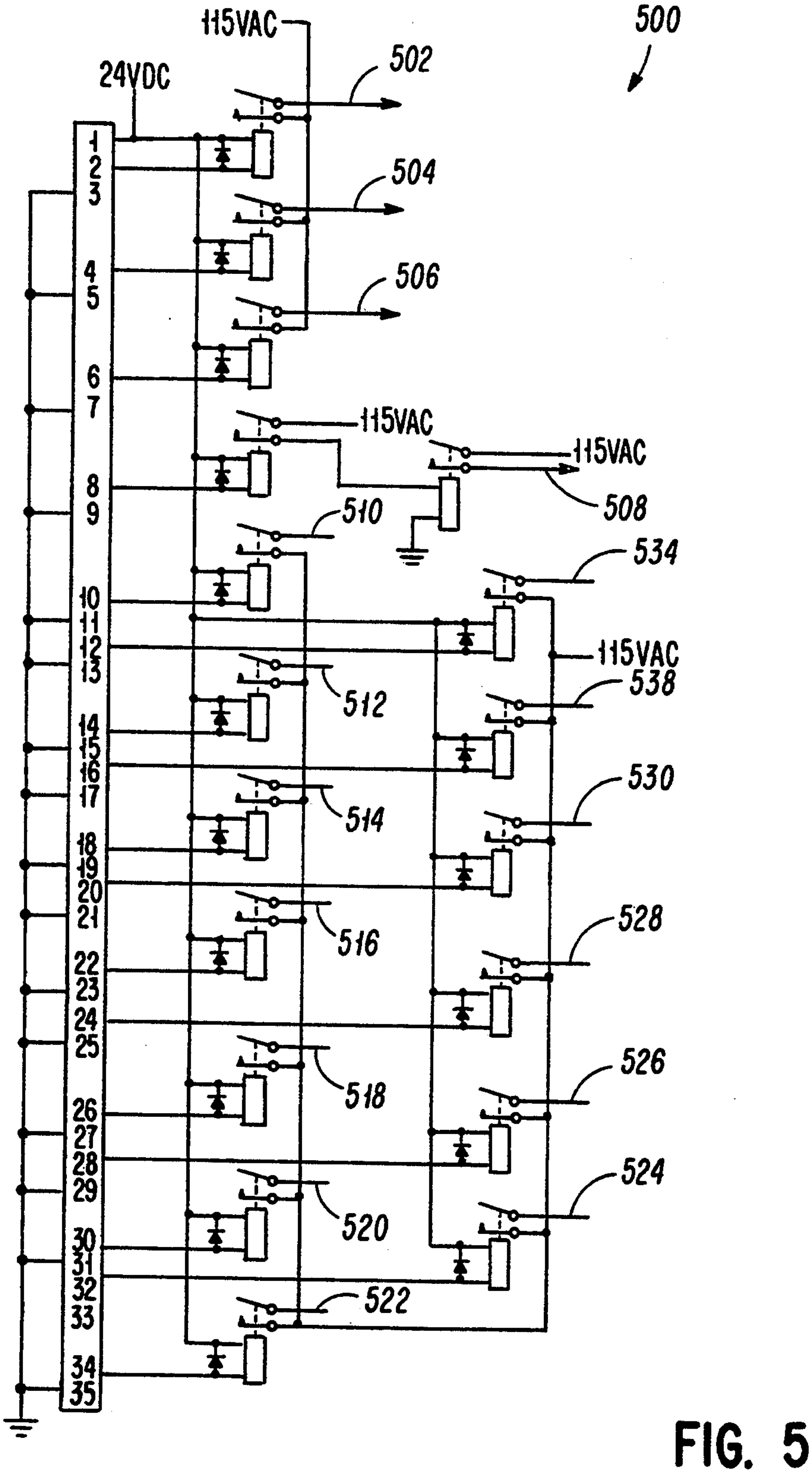
FIG. 5 is a schematic electrical diagram of the control interface of the present invention.

Now referring to FIG. 5, there is shown an electronic schematic diagram, of the relay interface of the present invention, generally designated 500.

The control interface for the isolation valves, the tip off ovens, and the vacuum pumps to the computer system preferably consist of a set of relays which will be activated by the computer system.

The control relay interface 500 shows numerous switches coupled to the line 502 to tip off ovens for station 1, the line 504 to tip off ovens for station 2, the line 506 to tip off ovens for station 3, the line 508 to the molecular drag pump, the line 510 to inlet isolation valve for station 1, the line 512 to inlet isolation valve for station 2, the line 514 to inlet isolation valve for station 3, the line 516 to flow controller isolation valve, the line 518 to the roughing pump isolation valve, the line 520 to the oven closing actuator, the line 522 to the oven opening actuator, the line 524 to the oven door closing actuation, the line 526 to the oven door opening actuation, the line 528 to the roughing pump, the line 530 to exhaust isolation valve for station 3, the line 532 to exhaust isolation valve for station 2, the line 534 to exhaust isolation valve for station 1.

Now referring to FIG. 6, there is shown an analog interface, generally designated 600. The outputs of the flow controller and oven controller preferably are brought out to the connector 602 on the side of the electronics cabinet 160, the output of the flow controller is preferably an electrical signal proportional to the flowrate. The connection between the controllers and connector 602 is preferably made with twisted shielded pairs.

The lamp station temperature monitors are preferably type J (iron/Constantan) thermocouples. Connector 604 is mounted on the electronics cabinet 160 and connects the cabinet 160 to the thermocouples.

Now referring to FIG. 7, there is shown an electronic diagram, generally designated 700 which is used to monitor the switches on the oven where switch 702 controls signals corresponding to the oven open position, switch 704 controls signals corresponding to the oven closed position, switch 706 controls signals corresponding to the door open position and switch 708 control signals corresponding to the door closed position.

It is contemplated that numerous variations to the above described apparatus would likely be desirable in order to conform the apparatus to the particular needs of a particular lamp design.

It is thought that the miniature fluorescent lamp processing apparatus of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form herein before described being merely a preferred or exemplary embodiment thereof.

We claim:

1. A system for manufacturing miniature fluorescent lamps comprising:

a pair of parallel rails having a first end and a second end, an end plate fixed at the first end of said rails, said end plate having an oven side and a manifold side;

a five sided rectangular box having a backside, a topside, a bottomside, a first end, a second end and an open side, said box translatably disposed on said rails so that said open side is disposed between said backside and said end plate and so that said end plate covers said open side when said box is translated adjacent said end plate a first tip off exhaust oven and a first tip off inlet oven disposed on said manifold side of said end plate;

a first lamp station disposed about said end plate having a first exhaust port and a first inlet port extending through said end plate, said first lamp station having a first temperature probe disposed on said oven side of said end plate;

a second lamp station having a second exhaust port and a second inlet port extended through said end plate, and a second temperature probe disposed on said oven side of said end plate, a second tip off exhaust oven and a second tip off inlet oven disposed on said manifold side of said end plate;

an inlet manifold disposed on said manifold side of said end plate;

an exhaust manifold disposed on said manifold side of said end plate;

a first inlet tube coupling said first inlet port and said inlet manifold having a first inlet electrically controlled valve disposed therein;

a first exhaust tube coupling said first exhaust port and said exhaust manifold having an electronically controlled valve disposed therein;

a second exhaust tube coupling said second exhaust port and said exhaust manifold, said tube having second exhaust electronically controlled valve disposed therein;

a second inlet tube coupling said second inlet port and said inlet manifold said second inlet tube having a second inlet electronically controlled valve disposed therein; and, a computer processor coupled with said electronically controlled valves and said first temperature probe and said second temperature probe for electronically monitoring and manipulating the temperature and pressure within the oven.

2. An automated miniature fluorescent lamp processing system comprising:

an oven having a first lamp processing station and a second lamp processing station;

an inlet manifold, for distributing gases to the lamp processing stations;

an exhaust manifold for collecting gases from the lamp processing stations;

a computer processor;

said first lamp processing station having a first electrically controlled inlet valve coupled to said oven and said inlet manifold and electrically coupled to said computer processor;

said first lamp processing station having a first electrically controlled exhaust value coupled to said oven and said exhaust manifold and electrically coupled to said computer processors;

said second lamp processing station having a second electrically controlled inlet valve coupled to said oven and said inlet manifold and electrically coupled to said computer processor;

said second lamp processing station having a second electrically controlled exhaust value coupled to said oven and said exhaust manifold and electrically coupled to said computer processor;

a first lamp having a first inlet end which is coupled to the first electrically controlled inlet valve, and further having a first exhaust end which is coupled to said first electrically controlled exhaust valve;

a second lamp having a second inlet end which is coupled to the second electrically controlled inlet valve, and further having a second exhaust end which is coupled to the second electronically controlled exhaust valve; and, whereby, gas flow and pressure within the first lamp and the second lamp can be regulated by manipulating the electrically controlled inlet valves and electronically controlled exhaust valves.

3. Lamp processing system of claim 2, further comprising:

a first temperature sensor disposed at said first lamp processing station; and, a second temperature sensor disposed at said second lamp processing station;

whereby the flow and pressure of gas through the first lamp and the second lamp can be regulated as a function of the temperature associated at each lamp processing station.

4. A lamp processing system of claim 3 further comprising:

a first electronically controlled inlet tip off oven disposed at said first lamp processing station; and, a second electronically controlled tip off oven disposed at said second lamp processing station.

5. A system for manufacturing miniature fluorescent lamps comprising:

a pair of parallel rails having a first end and a second end, an end plate fixed at the first end of said rails, said end plate having an oven side and a manifold side;

a five sided rectangular box having a backside, a topside, a bottomside, a first end, a second end and an open side, said box translatably disposed on said rails so that said open side is disposed between said backside and said end plate and so that said end plate covers said open side when said box is translated adjacent said end plate a first tip off exhaust oven and a first tip off inlet oven disposed on said manifold side of said end plate;

a first lamp station disposed about said end plate having a first exhaust port and a first inlet port extending through said end plate, said first station having a first temperature probe disposed on said oven side of said end plate;

a second station having a second exhaust port and a second inlet port extended through said end plate, and a second temperature probe disposed on said oven side of said end plate, a second tip off exhaust oven and a second tip off inlet oven disposed on said manifold side of said end plate;

an inlet manifold disposed on said manifold side of said end plate;

an exhaust manifold disposed on said manifold side of said end plate;

a first inlet tube coupling said first inlet port and said inlet manifold having a first inlet electrically controlled valve disposed therein;

a first exhaust tube coupling said first exhaust port and said exhaust manifold having an electronically controlled valve disposed therein;

a second exhaust tube coupling said second exhaust port and said exhaust manifold, said tube having second exhaust electronically controlled valve disposed therein;

a second inlet tube coupling said second inlet port and said inlet manifold said second inlet tube having a second inlet electronically controlled valve disposed therein;

a computer processor coupled with said electronically controlled valves and said first temperature probe and said second temperature probe for electronically monitoring and manipulating the temperature and pressure within the oven;

means for providing gas to said inlet manifold under regulated conditions;

means for removing gas from said exhaust manifold under regulated conditions;

means for displaying a pressure reading representative of the pressure in the intake manifold;

means for displaying a pressure reading representative of the pressure in the exhaust manifold;

means for displaying a temperature reading representative of the temperature in each of said first lamp processing station and said second lamp processing stations; and, said computer processing means capable of determining a desired internal lamp pressure as a function of said temperature readings.

* * * * *